United States Patent
Priel et al.

(10) Patent No.: US 9,354,645 B2
(45) Date of Patent: May 31, 2016

(54) VOLTAGE REGULATING CIRCUIT WITH SELECTABLE VOLTAGE REFERENCES AND METHOD THEREFOR

(75) Inventors: Michael Priel, Netanya (IL); Dan Kuzmin, Givat Shmuel (IL); Sergey Sofer, Rishon Lezion (IL)

(73) Assignee: Freescale Semiconductor, Inc., Austin, TX (US)

( * ) Notice: Subject to any disclaimer, the term of this patent is extended or adjusted under 35 U.S.C. 154(b) by 219 days.

(21) Appl. No.: 14/115,223

(22) PCT Filed: May 27, 2011

(86) PCT No.: PCT/IB2011/052323
§ 371 (c)(1),
(2), (4) Date: Nov. 1, 2013

(87) PCT Pub. No.: WO2012/164341
PCT Pub. Date: Dec. 6, 2012

(65) Prior Publication Data
US 2014/0077598 A1    Mar. 20, 2014

(51) Int. Cl.
*G05F 1/56* (2006.01)
*G05F 1/46* (2006.01)
*G05F 1/563* (2006.01)
*H02M 1/00* (2006.01)

(52) U.S. Cl.
CPC ............... *G05F 1/468* (2013.01); *G05F 1/465* (2013.01); *G05F 1/56* (2013.01); *G05F 1/563* (2013.01); *H02M 2001/0025* (2013.01); *Y10T 307/406* (2015.04)

(58) Field of Classification Search
CPC ........... H02M 2001/0025; G05F 1/465; G05F 1/468; G05F 1/56; G05F 1/563; G05F 1/575
See application file for complete search history.

(56) References Cited

U.S. PATENT DOCUMENTS

| | | | |
|---|---|---|---|
| 5,319,302 A | 6/1994 | Koshikawa et al. | |
| 6,208,127 B1 * | 3/2001 | Doluca | 323/349 |
| 6,348,833 B1 * | 2/2002 | Tsujimoto et al. | 327/540 |
| 6,384,645 B2 | 5/2002 | Brambilla et al. | |
| 6,694,272 B1 * | 2/2004 | Zvonar | H02M 3/157 702/64 |
| 6,806,763 B2 | 10/2004 | Kim et al. | |
| 7,102,560 B2 | 9/2006 | Casper et al. | |
| 7,501,805 B2 * | 3/2009 | Chen | H02M 1/36 323/282 |
| 2006/0197513 A1 | 9/2006 | Tang et al. | |
| 2008/0030077 A1 * | 2/2008 | Tiry et al. | 307/43 |
| 2008/0088286 A1 | 4/2008 | Cho et al. | |
| 2008/0231243 A1 | 9/2008 | Zhong et al. | |

(Continued)

OTHER PUBLICATIONS

Internation Search Report and Written Opinion correlating PCT/IB2011/052323 dated Feb. 28, 2012.

*Primary Examiner* — Fred E Finch, III (57) ABSTRACT

A voltage regulating circuit is provided for regulating an output voltage in order to minimize an absolute difference between a level of said output voltage and a reference level. The voltage regulating circuit comprises a voltage regulator and a reference level generator. The reference level generator generates an internal reference level on the basis of said output voltage level and said reference level such that said internal reference level does not exceed said output voltage level by more than a maximum allowed increment. The voltage regulator regulates said output voltage in order to minimize an absolute difference between said output voltage level and said internal reference level. A method of regulating an output voltage is also disclosed.

14 Claims, 8 Drawing Sheets

(56) References Cited

U.S. PATENT DOCUMENTS

| | | | |
|---|---|---|---|
| 2009/0027110 A1* | 1/2009 | Lee | ............................... 327/538 |
| 2009/0224737 A1 | 9/2009 | Lou | |
| 2010/0066326 A1 | 3/2010 | Huang | |
| 2010/0253314 A1 | 10/2010 | Batting | |
| 2014/0043008 A1* | 2/2014 | Babazadeh et al. | ........... 323/304 |

* cited by examiner

FIG. 16

VOLTAGE REGULATING CIRCUIT WITH SELECTABLE VOLTAGE REFERENCES AND METHOD THEREFOR

FIELD OF THE INVENTION

This invention relates to a voltage regulating circuit and a method of regulating an output voltage.

BACKGROUND OF THE INVENTION

Voltage regulating circuits may be encountered in virtually all kinds of electric and electronic devices. Typically, a voltage regulating circuit controls an output voltage such that the output voltage level differs as little as possible from a defined reference level. A voltage level is an instantaneous value of the voltage between two defined points or, equivalently, a momentary value of the electrical potential at a defined point or node relative to a given reference potential, for example, a ground potential. A reference level may also be referred to as a target level.

A voltage regulating circuit may comprise a feedback mechanism for controlling the output voltage level in dependence on the output voltage level. The voltage regulating circuit may, for instance, be arranged to adapt the output voltage level by iteration on the basis of the difference between the output voltage level and the reference level. However, non-iterative voltage regulating circuits also exist.

The output voltage may be applied to a consumer, such as a functional unit of an electronic circuit in order to power the consumer. The power consumption may be controlled by means of the reference voltage. For instance, a consumer powered by the output voltage may be powered on and off in dependence on whether the reference level is above or below a certain threshold. In a typical scenario, the reference voltage is set to e.g., 9 volts for powering the consumer and to, e.g., 0 volts for switching the consumer off or for setting it into an idle or sleep state.

Varying the reference level may, however, induce undesired variations in the level of the supply voltage. For instance, increasing the reference level quasi instantly from, e.g., 0 volts to, e.g., 9 volts may cause an undesired sag in the supply voltage level. Such sag or voltage drop may affect other consumers that are possibly powered by the supply voltage. Therefore, it may be beneficial to provide circuitry in which the supply voltage level is less sensitive to a consumer being switched on or off.

U.S. patent application publication number US 2010/0253314 A1 (Bitting) describes an adaptive voltage and scaling optimization optimization circuit which detects operating parameters of a core logic and generates a voltage control signal to control a reference voltage regulator.

U.S. Pat. No. 6,384,645 B2 (Brambilla and Cleris) describes an integrated circuit for producing a small slope voltage ramp.

SUMMARY OF THE INVENTION

The present invention provides a voltage regulating circuit and a method of regulating an output voltage as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
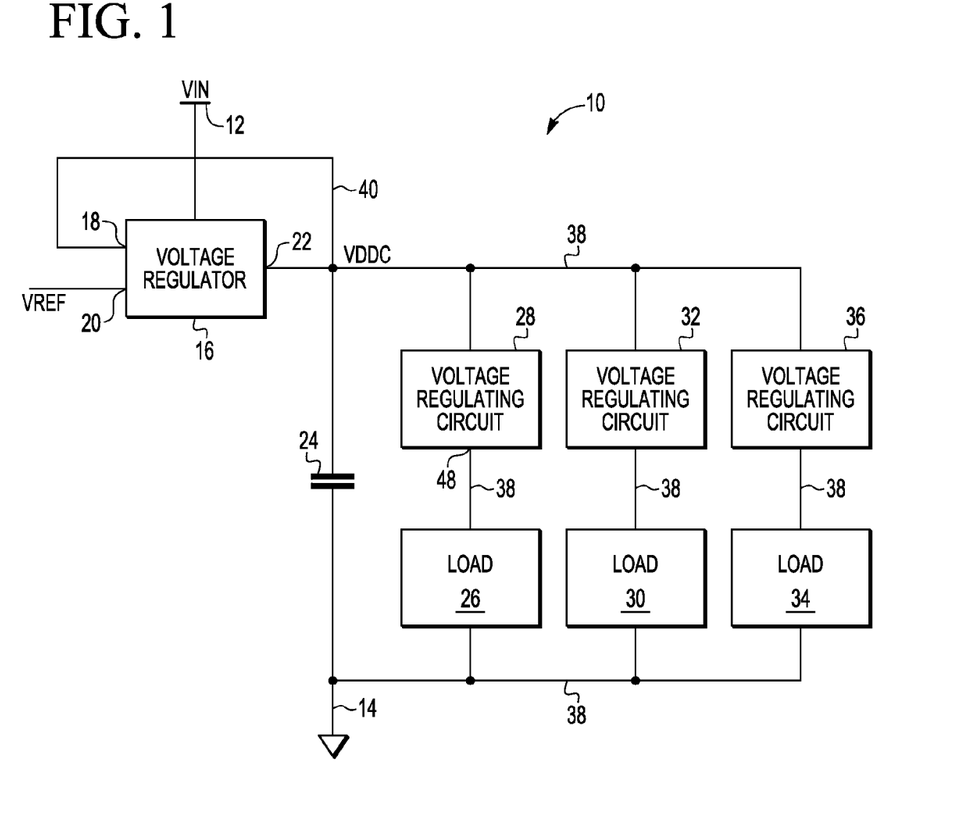
FIG. 1 schematically shows an example of an embodiment of an electronic device.

FIG. 1 illustrates an example of an electronic device 10. Device 10 may comprise, for example, a voltage supply 12 for providing a voltage relative to ground 14, a voltage regulator 16 for providing an operating voltage VDDC, and one or more consumers (loads) for being powered by the operating voltage VDDC. Voltage supply 12 may, for example, be a battery or an AC to DC converter. In the example, said one or more loads comprise a first load 26, a second load 30, and a third load 34 coupled in parallel. The loads 26, 30, and 34 may thus be operated independently from each other. Further, a capacitor 24 may be coupled in parallel to the loads 26, 30 and 34 for stabilizing the operating voltage VDDC. The various components of the electronic device 10 may be connected by conductor 38.

Voltage regulator 16 may comprise, for example, a first input 18, a second input 20, and an output 22. Output 22 may be connected to the first input 18 via a feedback loop 40. Voltage regulator 16 may receive a reference voltage VREF via the second input 20 and regulate the output voltage VDDC accordingly. For instance, voltage regulator 16 may compare the output voltage level VDDC received via first input 18 to the reference level VREF received via second input 20 and perform a controlling action in dependence on the difference between operating voltage level VDDC and reference level VREF. The controlling action may, for example, comprise opening or closing a power switch in the voltage regulator 16. Voltage regulator 16 may also be referred to as operating voltage regulator or external regulator.

Each of said loads 26, 30, and 34 may be coupled in series with a power switch or other kind of voltage regulating circuit 28, 32, 36. In the example, a power regulating circuit 28 is connected in series to the first load 26. Voltage regulating circuit 28 may be operable to control the operating voltage applied across the first load 26. For example, voltage regulating circuit 28 may be arranged to reduce the operating voltage across load 26 to, e.g., 0 in order to save energy when load 26 does not need to be operated. Similarly, voltage regulating circuits 32 and 36 may be coupled in series to loads 30 and 34, respectively.

To summarize, the voltage regulating circuit 28 may be connected to a load, such as load 26 shown in FIG. 1. The load may thus be powered by the output voltage. For instance, the voltage regulating circuit 28 may form part of an electronic device, e.g. electronic device 10. Electronic device 10 may, for instance, comprise two or more loads 26, 30, 34 and a voltage source 22 for powering the loads. The loads 26, 30, 34 may be connected parallel. The voltage regulating circuit 28 may notably be connected between the voltage source 22 and a first one (in the example, load 26) of the loads so as to apply the output voltage VDDG to the first load.

Figure 2:
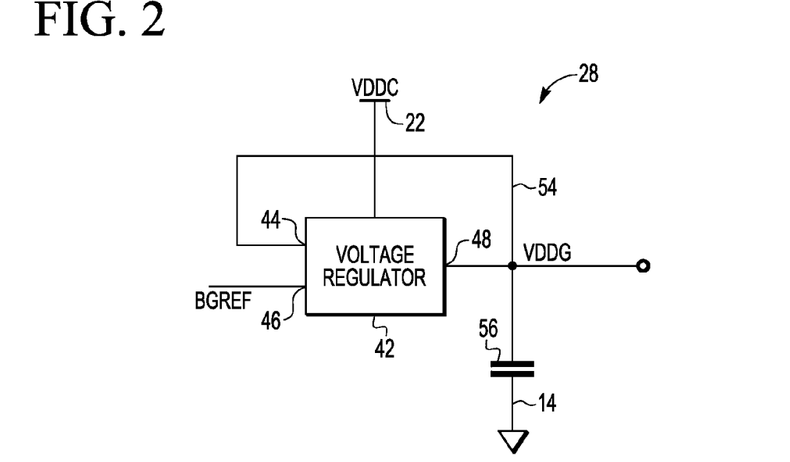
FIG. 2 schematically shows an example of an embodiment of a voltage regulating circuit.

An example of an embodiment of a voltage regulating circuit 28 is described in reference to FIG. 2. In the shown example, voltage regulating circuit 28 is of a design similar to voltage regulator 16 described above in reference to FIG. 1. Voltage regulator 42 may comprise an output 48 for providing an output voltage VDDG, a first input 46 for receiving a reference voltage BGREF, and a second input 44 for receiving the output voltage VDDG via a feedback loop 54. Voltage regulator 42 may be arranged to compare the output voltage VDDC to the reference voltage BGREF and to control the output voltage VDDG accordingly, such that a difference between VDDG and BGREF is minimized iteratively. The output voltage VDDG may be applied to, for example, load 26 shown in FIG. 1. Alternatively, voltage regulating circuit 28 may be integrated in or connected to other kinds of circuitry. The voltage regulating circuit 28 may further comprise a capacitor 56 for stabilizing the output voltage VDDG. Capacitor 56 may, for example, be coupled between output 48 and ground 14. In other words, capacitor 56 may be coupled in parallel to load 26.

An abrupt variation of the reference voltage BGREF, for instance, a sudden low to high transition for switching on the load 26, may provoke a temporary drop in the operating voltage VDDC provided by, e.g., output 22 of the operating voltage regulator 16. Such a drop may be caused by charge sharing, for example between the capacitors 24 and 56. Electrical charge accumulating at capacitor 56 to increase the output voltage VDDG may be drawn in part from capacitor 24. In other words, capacitor 24 may temporarily lose some of its charge to capacitor 56. The resulting sag in the operating voltage VDDC may eventually be corrected by regulator 16 but may nevertheless have undesired effects, for instance, on other loads powered by the operating voltage VDDC, e.g. loads 30 and 34 shown in FIG. 1.

Figure 3:
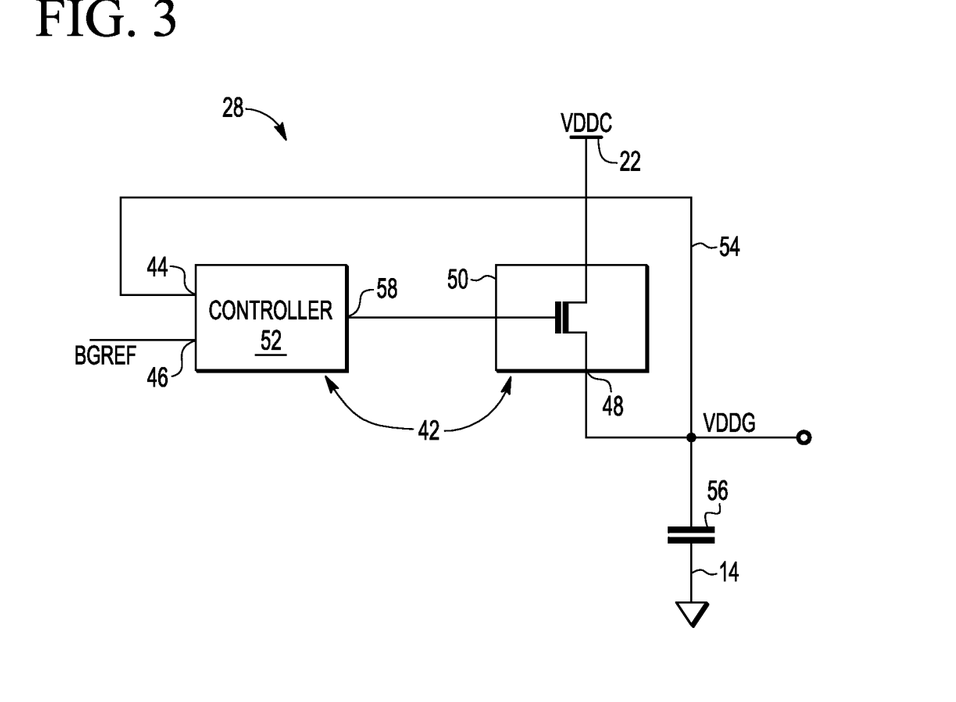
FIG. 3 schematically shows an example of an embodiment of a voltage regulating circuit.

FIG. 3 further illustrates an example of a voltage regulator 42 described above in reference to FIG. 2. Voltage regulator 42 may, for example, comprise a power switch 50 and a controller 52 for controlling power switch 50. Power switch 50 may, for example, be a transistor, for example a PMOS or NMOS field effect transistor (FET). In the example, power switch 50 is a PMOS transistor having a source connected to operating voltage provider 22 (output 22 of regulator 16), a drain connected to output 48 for providing the output voltage VDDG, and a gate connected to controller 52. Controller 52 may comprise, for example, an output 58 for providing a controlling voltage to the gate of PMOS transistor 50, the first input 46 for receiving reference level BGREF, and a second input 44 for receiving the output voltage VDDG via feedback loop 54. Controller 52 may be arranged to control the controlling voltage and, thus, the source-to-drain conductivity of PMOS transistor 50 in dependence on the difference between the output voltage level VDDG and the reference level BGREF. For instance, controller 52 may be arranged to increase the source-to-drain conductivity, i.e., open the switch 50, in response to VDDG being less than BGREF, and decrease the source-to-drain conductivity, i.e., close the switch 50, in response to VDDG being above BGREF. When power switch 50 is open (conductive), an electrical charging current from operating voltage provider 22 to capacitor 56 and/or any load, e.g. load 26, connected to output 48 may occur, possibly causing a sag in the operating voltage VDDC.

Figure 4:
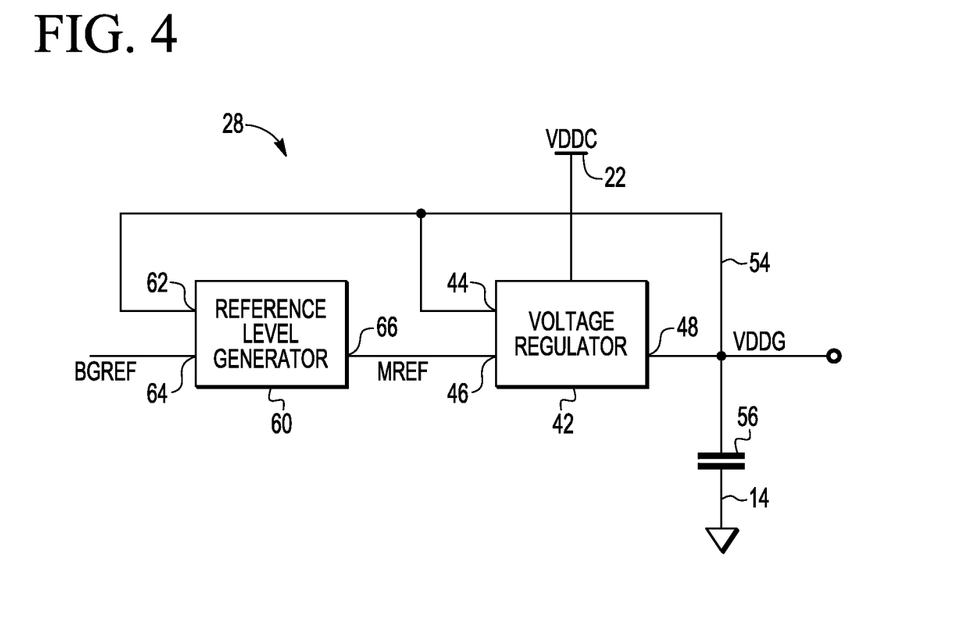
FIG. 4 schematically shows an example of an embodiment of a voltage regulating circuit comprising a reference level generator.

FIG. 4 illustrates an example of a modified embodiment of voltage regulating circuit 28 described above in reference to FIGS. 1, 2, and 3. The voltage regulating circuit 28 may regulate an output voltage in order to minimize an absolute difference between a level of the output voltage VDDG and the reference level BGREF. An absolute difference is the absolute value of a difference between two values. The voltage regulating circuit 28 may notably comprise a voltage regulator 42 and a reference level generator 60 connected to the voltage regulator 42. The reference level generator 60 may be arranged to generate an internal reference level MREF, on the basis of, e.g., the output voltage level VDDG and the reference level BGREF, such that the internal reference level MREF does not exceed the output voltage level VDDG by more than a maximum allowed increment. The voltage regulator 42 may be arranged to regulate the output voltage in order to minimize an absolute difference between the output voltage level VDDG and the internal reference level MREF. To this end, the voltage regulating circuit 28 comprise, for example, a feedback loop 54 for feeding the output voltage level VDDG back to the voltage regulator 42.

More specifically, the voltage regulating circuit 28 as shown may comprise a reference level generator 60 for generating a modified reference level MREF, referred to herein as internal reference level. Reference level generator 60 may comprise a first input 64 for receiving the original (external) reference level BGREF, a second input 62 for receiving the output voltage level VDDG via feedback loop 54, and an output 66 for providing the internal reference level MREF. Output 66 of the reference level generator 60 may be connected to input 46 of voltage regulator 42. Thus, the internal reference level MREF may be fed to voltage regulator 52 in place of the external reference level BGREF. Reference level generator 60 may be arranged to generate the internal reference level MREF on the basis of the output voltage level VDDG and the reference level BGREF. More specifically, reference level generator 60 may be arranged to generate the internal reference level MREF such that the internal reference level MREF does not exceed the output voltage level (VDDG) by more than a maximum allowed increment. The variation in time of the internal reference level MREF and hence the variation in time of the output voltage VDDG may thus be limited. A sag in the operating voltage caused by variations in the output voltage level VDDG may thus be reduced.

Figure 5:
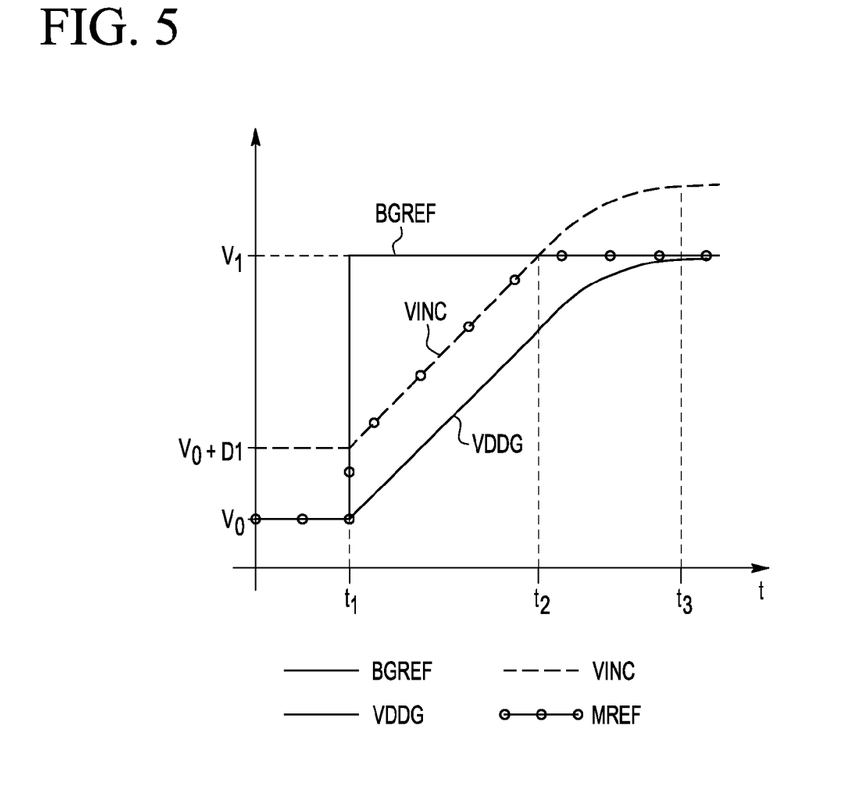
FIG. 5 shows a schematic graph of a reference level, an output voltage level, an incremented level and an internal reference level as functions of time.

Operation of an example of the voltage regulating circuit 28 described above in reference to FIG. 4 is further described in reference to FIG. 5. In the shown scenario, the reference level BGREF received by reference level generator 60 assumes a low level V0 and a high level V1 at instants T before T1 and instants T after T1, respectively. At time T1, reference level BGREF passes quasi instantaneously from V0 (low) to V1 (high), for example, in response to a switch on signal indicating that a load, e.g., load 26 is to be activated or switched on.

The output voltage level VDDG may be generated in response to the reference level BGREF. In the example, reference level generator 60 may generate an incremented level VINC which is higher than the output voltage level VDDG. In the example, VINC equals VDDG plus D1, D1 being a fixed or adjustable increment. Reference level generator 60 may be arranged to output as internal reference level MREF either the external reference level BGREF or the incremented level VINC depending on which one is higher. More specifically, reference level generator 60 may output the incremented level VINC when reference level BGREF is higher than the incremented level VINC, and otherwise output reference level BGREF. Thus, it may be ensured that the internal reference level MREF is less than or equal to the incremented level VINC at any instant T. Furthermore, it may be ensured that the reference level BGREF is output as the internal reference level MREF when the output voltage level VDDG has approached the reference level BGREF. In the example, this occurs at instant T2, namely, when the incremented level VINC has reached the reference level BGREF. At time T3, the output voltage level VDDG has practically the reference level BGREF. It is noted that at any instant T, the rate of change of output voltage level VDDG, i.e. the time derivative of VDDG, may be proportional to the difference between output level VDDG and internal reference level MREF, multiplied by a gain of voltage regulator 42.

Figure 6:
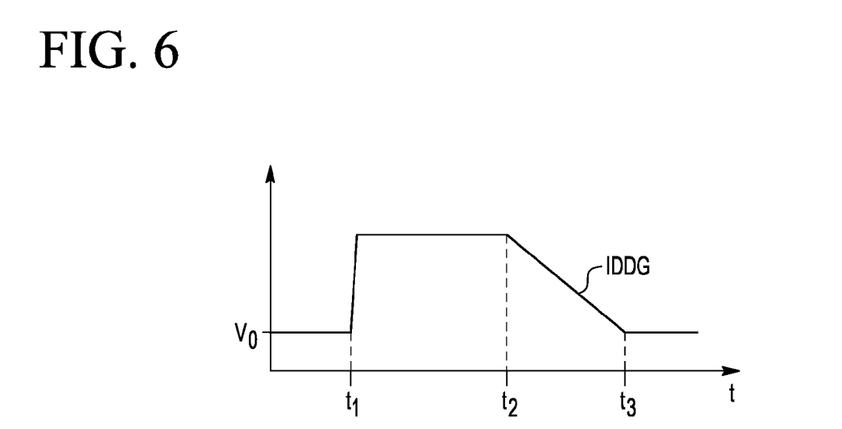
FIG. 6 shows a schematic graph of a charging current as function of time.

The resulting charging current IDDG, defined as the electrical current through e.g. regulator 42, may be equal or at least approximately equal to the time derivative of the output voltage level VDDG. The charging current IDDG of the example scenario of FIG. 1 is schematically plotted as a function of time T in FIG. 6.

Figure 7:
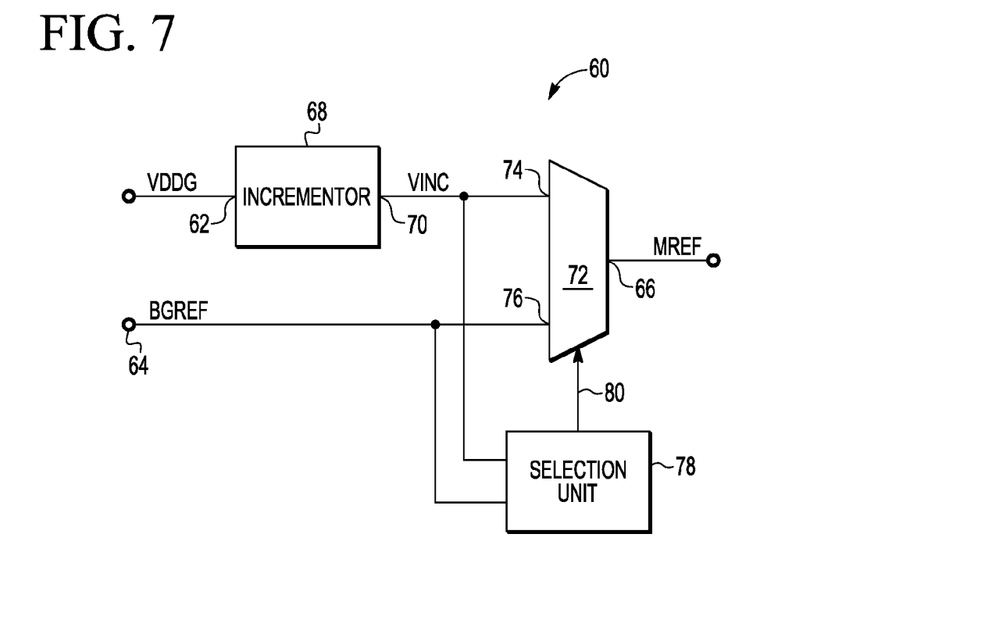
FIG. 7 schematically shows an example of an embodiment of a reference level generator.

Referring now to FIG. 7, the reference level generator 60 may comprise an incrementer 68, a selection unit 78 and a multiplexer 72 responsive to the selection unit 78. The incrementer 68 may be arranged to generate, on the basis of the output voltage level VDDG, an incremented level VINC higher than the output voltage level VDDG. The selection unit 78 may be arranged to select the internal reference level MREF among two or more multiplexer input levels. The multiplexer input levels may comprise, for example, at least the reference level BGREF and the incremented level VINC. The multiplexer 72 may be arranged to forward the internal reference level MREF to the voltage regulator 42.

The selection unit 78 may be arranged, for example, to select the incremented level VINC as the internal reference level MREF in response to the reference level BGREF being higher than the incremented level VINC. The selection unit 78 may additionally be arranged to select the reference level BGREF as the internal reference level MREF in response to the reference level BGREF being lower than the incremented level VINC.

Reference level generator 60 may thus comprise, for example, an incrementer 68, a multiplexer 72, and a selection unit 78, as schematically shown in FIG. 7. Incrementer 68 may be arranged to receive the output voltage level VDDG via input 62 and to output an incremented level VINC via output 70. Reference level BGREF and incremented level VINC may be fed to a first input 76 and a second input 74 of multiplexer 72, respectively. Multiplexer 72 may output either incremented level VINC or reference level BGREF as prescribed by a selection signal 80. Selection signal 80 may be generated by selection unit 78 on the basis of, e.g. reference level BGREF and incremented level VINC.

Figure 8:
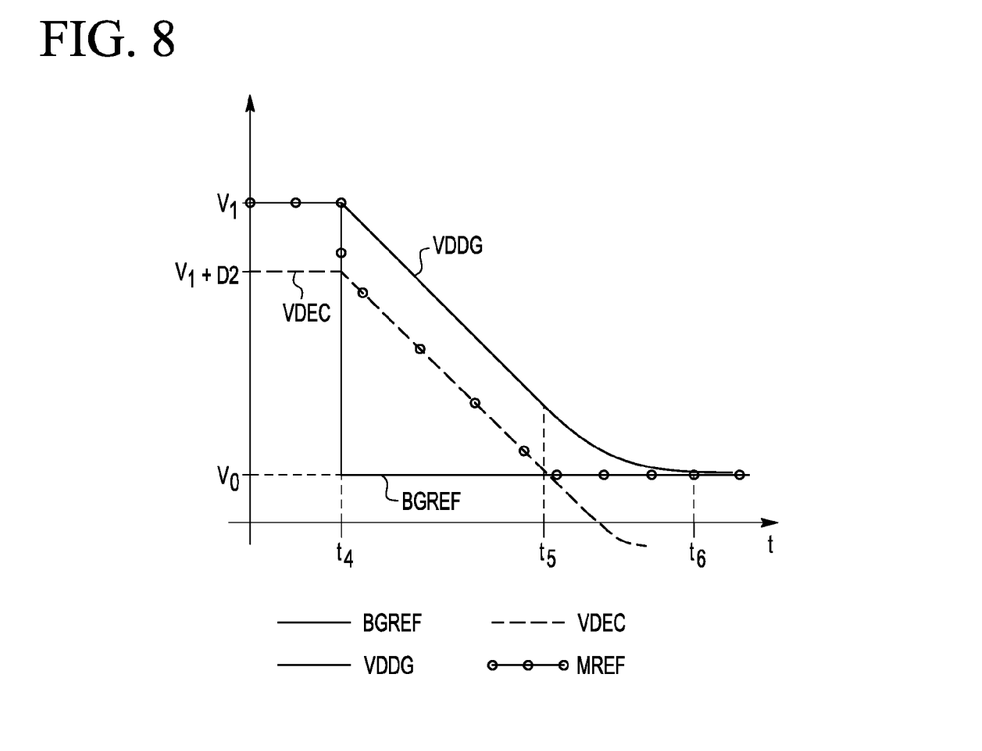
FIG. 8 shows a schematic graph of a reference level, an output voltage level, a decremented level, and an internal reference level as functions of time.

Referring now to FIG. 8, the reference level generator 60 may be arranged to generate the internal reference level MREF such that the internal reference level MREF does not differ from the output voltage level VDDG in absolute value by more than a maximum allowed difference. For example, the voltage regulating circuit 28 described above in reference to FIGS. 4 to 7 may be arranged to restrict the variation of said internal reference level MREF not only when the external reference level BGREF is increased, but also when the external reference level is decreased. In other words, the reference level generator 60 may be adapted to handle not only low to high transitions of the reference level BGREF (rising edges, see FIG. 5) but also high to low transitions (falling edges, see FIG. 8). To this end, the reference level generator 60 may generate a decremeted level VDEC that is lower than the output voltage level VDDG, and further select as internal reference level MREF one of said levels VINC, BGREF, and VDEC. The plot in FIG. 8 illustrates a scenario in which the external reference level BGREF changes abruptly from level V1 (high) to level V0 (low) at instant T4. In the example, reference level generator 60 outputs, as internal reference level MREF, the decremeted level VDEC if reference level BGREF is lower than decremeted reference level VDEC, and reference level BGREF otherwise. Thus, a high to low transition may be treated in a manner that is analogous to the one described above in reference to a low to high transition.

As illustrated in FIG. 7, the reference level generator 60 may further comprise a decrementer 82 for generating, on the basis of the output voltage level VDDG, a decremented level VDEC lower than the output voltage level VDDG. The multiplexer input levels may further comprise the decremented level VDEC. The selection unit 78 may be arranged to select the decremented level VDEC as the internal reference level MREF, e.g. in response to the reference level BGREF being lower than the decremented level VDEC. The selection unit 78 may notably be arranged to select the reference level BGREF as the internal reference level MREF in response to the reference level BGREF being lower than the incremented level VINC but higher than the decremented level VDEC.

Reference level generator 60 may thus comprise, in addition said incremeter 68, a decrementer 82 having an output 84 for outputting a decremented level VDEC higher than said output voltage level VDDG. The incremented level VINC, the decremented level VDEC, and the reference level BGREF may be fed to multiplexer 72 which outputs one of these signals in accordance with selection signal 80. Selection signal 80 may be generated by selection unit 78 on the basis of, e.g., the incremented level VINC, the decremented level VDEC, and the reference level BGREF. The level that is output by multiplexer 72, that is the level selected by selection unit 8 may constitute or represent the internal reference level MREF.

Figure 10:
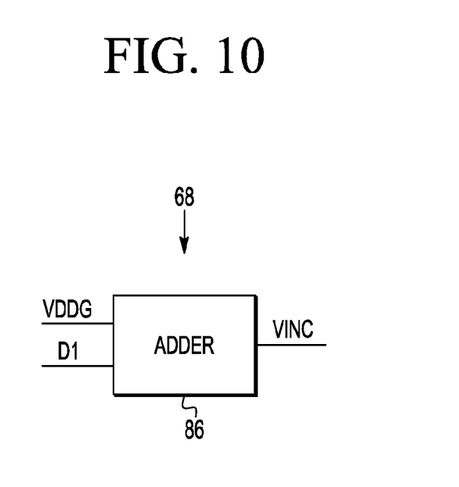
FIG. 10 schematically shows an example of an embodiment of an incrementer.

Incrementer 68 may, for example, comprise an adder 86 for adding an increment D1 to output voltage level VDDG to generate said incremented level VINC (see FIG. 10). Adder 86 may comprise, e.g., a summing amplifier.

Figure 11:
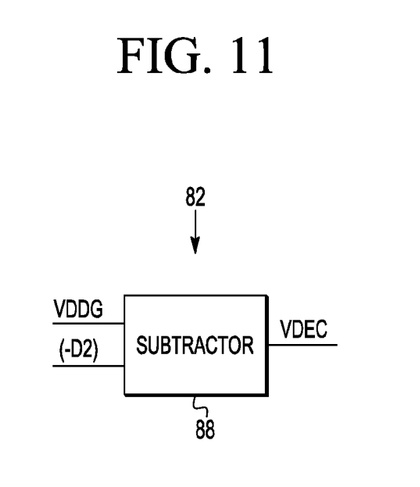
FIG. 11 schematically shows an example of an embodiment of a decrementer.

Similarly, decrementer 82 may comprise a subtractor 88 for subtracting a decrement D2 from output voltage level VDDG to generate said decremented level VDEC (see FIG. 11). Subtractor 88 may comprise, e.g., a differential amplifier.

Figure 9:
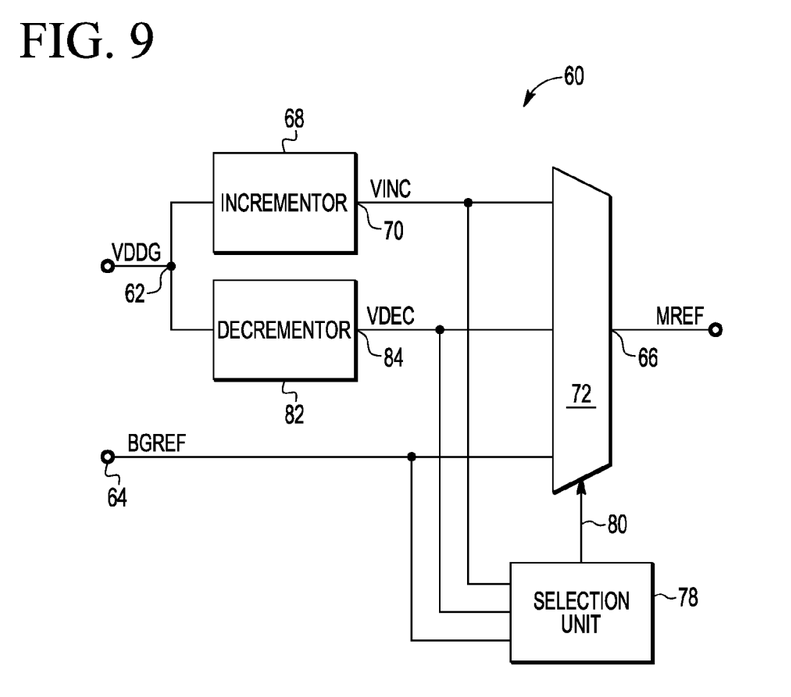
FIG. 9 schematically shows an example of an embodiment of a reference level generator.

In many applications, it may be sufficient to limit the rate of change (i.e. the time derivative, or slope, or slew rate) of the output voltage level, e.g. VDDG, only in the event of a rising edge of the reference level, e.g. BGREF, while falling edges may be unproblematic. For instance, as explained above, a sharp increase of the output voltage level may induce a sag in the operating voltage level, e.g., VDDC. On the other hand, a sharp decrease of the output voltage VDDG does not necessarily have any noticeable effect on the operating voltage. A voltage regulating circuit 28 as described above in reference to FIGS. 4, 5, and 6 may be particularly well adapted for such applications. For other applications, a voltage regulating circuit 28 capable of limiting the slew rate of the output voltage for both rising and falling edges may be more convenient. A method of limiting the slew rate of the output voltage level for both rising and falling edges is described, by way of example, in reference to FIGS. 12 and 13. The method may be performed, for instance, using the voltage regulating circuit 28 described above in reference to FIG. 9. It is noted that the method can easily be adapted in order to limit the slew rate of the output voltage level VDDG in the event of rising edges only.

Figure 12:
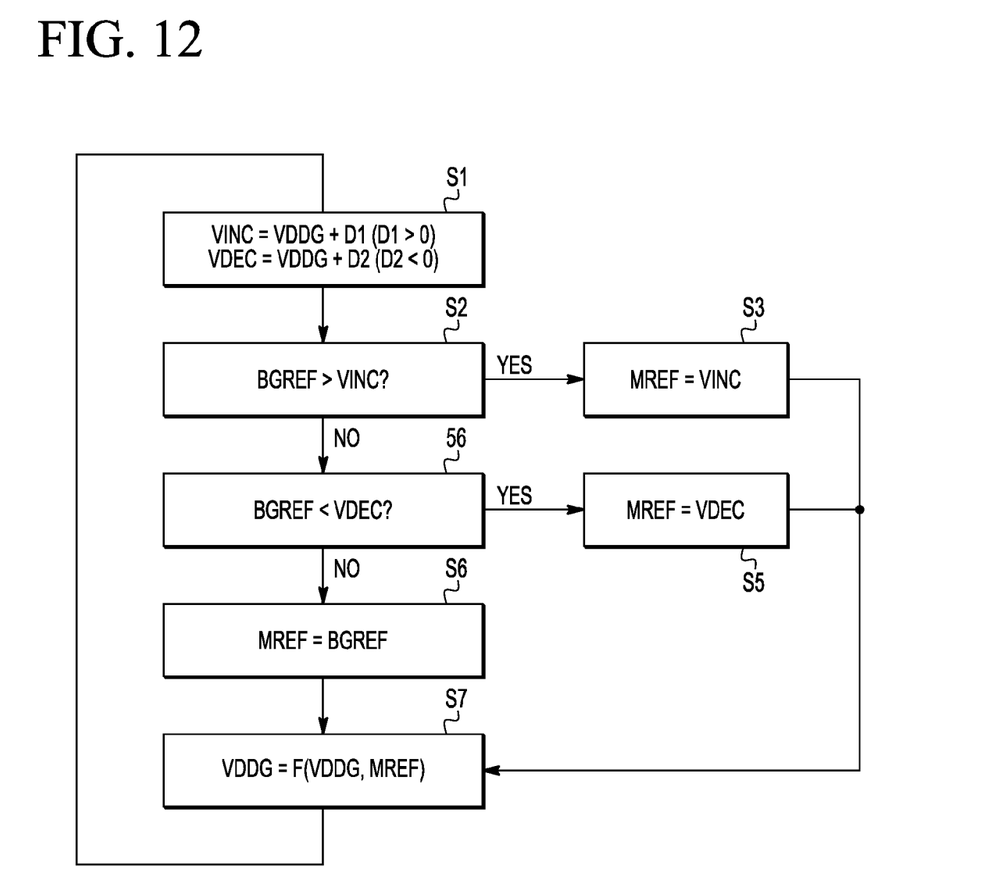
FIG. 12 schematically shows an example of an embodiment of a method of regulating an output voltage.
Figure 13:
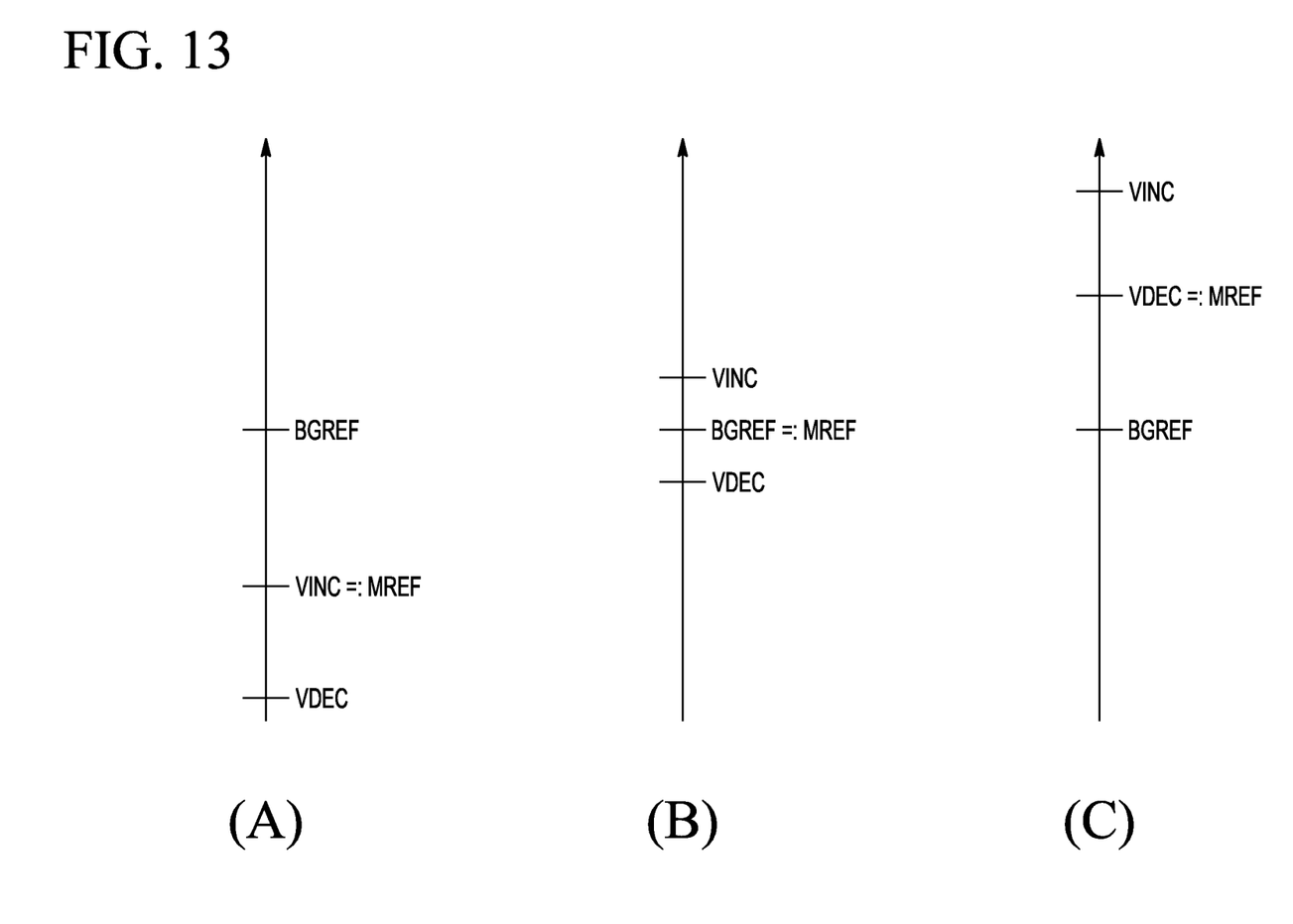
FIG. 13 schematically shows an example of an embodiment of a method of regulating an output voltage.

FIGS. 12 and 13 illustrate an example of a method of regulating an output voltage. Regulating means controlling or influencing the output voltage in order to minimize an absolute difference between a level VDDG of the output voltage and a reference level BGREF. An internal reference level MREF may be generated (blocks S to S6) on the basis of the output voltage level VDDG and the reference level BGREF such that the internal reference level MREF does not exceed the output voltage level VDDG by more than a maximum allowed increment. The output voltage may be regulated (block S7) in order to minimize an absolute difference between the output voltage level VDDG and the internal reference level MREF. The reference level BGREF may, for example, rise from a low level to a high level. The low level and the high level may, for instance, be the levels V0 and V1, respectively, as shown in FIG. 5. The maximum allowed increment may be less than, e.g., twenty percent of the difference between the low level and the high level. The rate of change of the output voltage can thus be limited.

For example, an incremented level VINC and a decremeted level VDEC may be generated from output voltage level VDDG (block S1). Incremented level VINC may be generated, for instance, by adding a positive increment D1 to output voltage level VDDG. Decremented level VDEC may be generated, for instance, by adding a negative decrement D2 to output voltage level VDDG. If reference level BGREF is higher than incremented level VINC (block S2), incremented level VINC may be used an internal reference level MREF (block S3), as schematically illustrated in FIG. 13, plot (A). If, however, reference level BGREF is lower than decremented level VDEC (block S4), decremented level VDEC may be used as internal reference level MREF (block S5), as schematically illustrated in FIG. 13, plot (C). If, however, reference level BGREF is not higher than incremented level VINC and not lower than decremented level VDEC, reference level BGREF may be used as internal reference level MREF (block S6), as schematically illustrated in FIG. 13, plot (B). A new output voltage level VDDG may then be generated in dependence on the current output voltage level VDDG and the current internal reference level MREF (block S7). For example, the new output voltage level VDDG may be generated by a voltage regulator on the basis of a difference, e.g. VDDG minus MREF, of output voltage level VDDG and internal reference level MREF. The process flow may then return to block S1.

The method described above in reference to FIG. 12 can be easily adapted to applications in which the output voltage level VDDG should be prevented from rising too rapidly but not from falling very rapidly. This may be achieved, for instance, by omitting block S4 in the flow chart of FIG. 12, so that the process flow proceeds from block S2 directly to block S6 if BGREF is equal to or less than VINC.

Similarly, by omitting step S2 in the flow chart of FIG. 12, so that the process flow proceeds from block S1 directly to block S4 if BGREF is equal to or greater than VDEC, the output voltage level VDDG may be prevented from decreasing too rapidly, while not preventing it from rising very rapidly.

Figure 14:
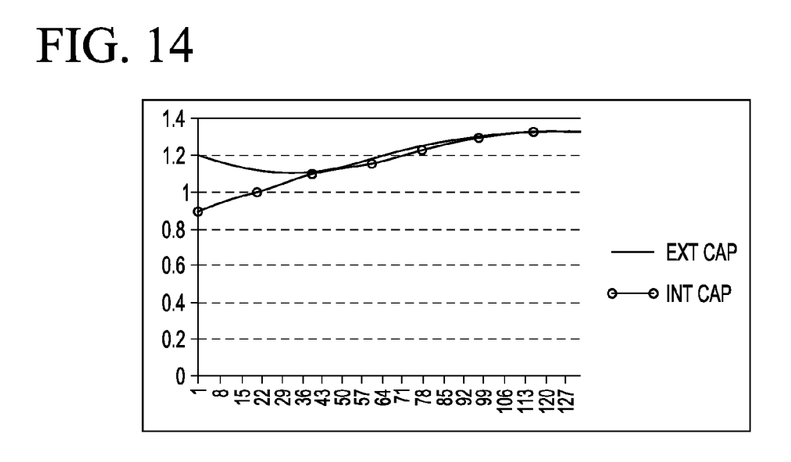
FIG. 14 shows a schematic graph of a supply voltage level and an output voltage level.
Figure 15:
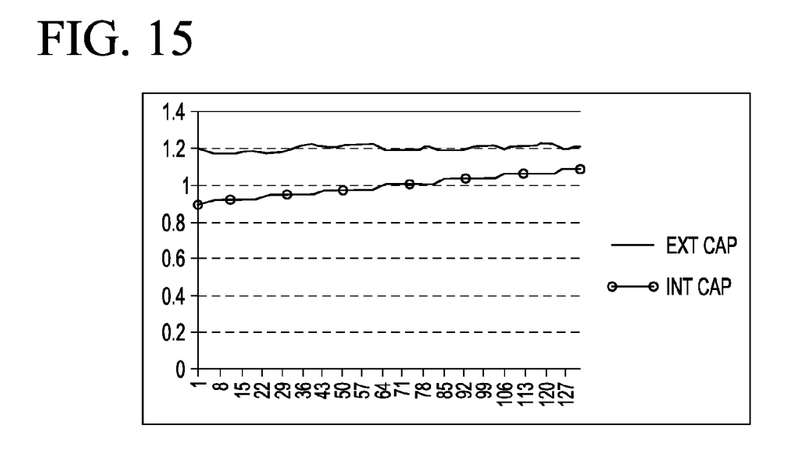
FIG. 15 shows a schematic graph of a supply voltage level and an output voltage level.
Figure 16:
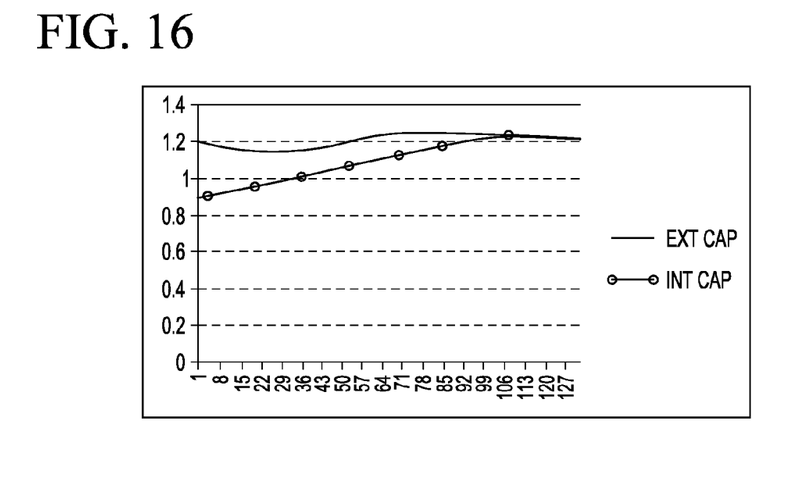
FIG. 16 shows a schematic graph of a supply voltage level and an output voltage level.

FIGS. 14, 15 and 16 illustrate experimental measurements of operating voltage level VDDC ("ext cap", full line) and output voltage level VDDG ("int cap", dotted line) observed in three different circuits. An external reference level BGREF (not plotted) was applied and varied identically in each of the three measurements.

FIG. 14 relates to a circuit in which output voltage level VDDG is controlled directly by a reference level BGREF that increases abruptly at instant 0. A voltage regulating circuit of the kind described above in reference to FIGS. 2 and 3 was used. The operating voltage level VDDC is seen to exhibit a sag with a minimum at about 35 microseconds.

FIG. 15 illustrates the behaviour of VDDC and VDDG for a technique in which an internal reference level MREF is generated as a predefined small-slope voltage ramp, in dependence on the reference level BGREF but not on the output voltage level VDDG. In the example, the internal reference level (MREF) was generated as an increasing step function. No sag was observed in the operating voltage VDDC.

FIG. 16 reports measurements performed on a voltage regulating circuit 28 as described above in reference to FIG. 4. In contrast to the technique described above in reference to FIG. 15, the internal reference level MREF was generated not only in dependence on reference level BGREF but also on the output voltage level VDDG. Compared to FIG. 14, the sag in the operating voltage level VDDC is significantly reduced.

In the foregoing specification, the invention has been described with reference to specific examples of embodiments of the invention. It will, however, be evident that various modifications and changes may be made therein without departing from the broader spirit and scope of the invention as set forth in the appended claims.

In this application, an input is a place or node at which energy or signals enter a device or circuit. An output is a place or node at which energy or signals leave a device or circuit.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, selection unit 78 and multiplexer 72 may be merged in one unit. Multiplexer 72 of FIG. 9 may be composed of two multiplexers connected in series.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, capacitors 24 and 56 may be located on a chip together with external regulator 16 and internal regulator 42.

Alternatively, the examples may be implemented as any number of separate integrated circuits or separate devices interconnected with each other in a suitable manner. For example, voltage regulating circuit 28 may be implemented as a separate integrated circuit that may be connected to a separate voltage source, e.g. output 22, and to one or more loads, e.g. load 26.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A voltage regulating circuit, for regulating an output voltage in order to minimize an absolute difference between a level of said output voltage and a reference level, said voltage regulating circuit comprising:
 a voltage regulator and a reference level generator connected to said voltage regulator, said reference level generator being arranged to generate an internal reference level on the basis of said output voltage level and said reference level such that said internal reference level does not exceed said output voltage level by more than a maximum allowed increment, said voltage regulator being arranged to regulate said output voltage in order to minimize an absolute difference between said output voltage level and said internal reference level, wherein:
 said reference level generator comprises an incrementer, a selection unit, and a multiplexer responsive to said selection unit;

said incrementer being arranged to generate, on the basis of said output voltage level an incremented level higher than said output voltage level;

said selection unit being arranged to select said internal reference level among two or more multiplexer input levels, said multiplexer input levels comprising at least said reference level and said incremented level; and said multiplexer being arranged to forward said internal reference level to said voltage regulator.

2. A voltage regulating circuit comprising:

a voltage regulator including an output to provide an output voltage;

an input to receive a target reference voltage;

a reference level generator to provide an internal reference voltage, a level of said internal reference voltage based on a level of said output voltage; and a selection unit to provide a selected one of said target reference voltage and said internal reference voltage to said voltage regulator, said selection based on a difference between said target reference voltage and said output voltage, wherein said reference level generator comprises an incrementer arranged to generate an incremented level higher than a level of said output voltage, and said selection unit is arranged to select said incremented level as said internal reference voltage in response to said target reference voltage being higher than said incremented level; or wherein said reference level generator further comprises a decrementer arranged to generate a decremented level lower than said output voltage and said selection unit is arranged to select said decremented level as said internal reference voltage in response to said target reference voltage being lower than said decremented level.

3. The voltage regulating circuit of claim 2, wherein said reference level generator is arranged to generate said internal reference voltage such that said internal reference voltage does not differ from said output voltage in absolute value by more than a maximum allowed difference.

4. The voltage regulating circuit of claim 2, wherein said selection unit is arranged to select said target reference voltage in response to said target reference voltage being lower than said incremented level.

5. The voltage regulating circuit of claim 2, wherein said incrementer comprises an adder arranged to generate said incremented level by adding a positive increment to said level of said output voltage.

6. The voltage regulating circuit of claim 2, wherein said selection unit is arranged to select said target reference voltage in response to said target reference voltage being lower than said incremented level but higher than said decremented level.

7. The voltage regulating circuit of claim 2, wherein said decrementer comprises a subtractor arranged to generate said decremented level by adding a negative increment to said level of said output voltage.

8. The voltage regulating circuit of claim 2, further comprising a feedback loop for feeding said output voltage back to said voltage regulator, said voltage regulator being arranged to vary said level of said output voltage on the basis of said level of said output voltage and said level of said internal reference voltage in order to minimize an absolute difference between said level of said output voltage and said level of said internal reference voltage.

9. The voltage regulating circuit of claim 2, wherein said voltage regulating circuit is connected to a load, said load arranged to be powered by said output voltage.

10. An electronic device comprising the voltage regulating circuit of claim 2, said electronic device comprising two or more loads and a voltage source for powering said loads, said loads being connected parallel, said voltage regulating circuit being connected between said voltage source and a first load of said loads so as to apply said output voltage to said first load.

11. A method comprising:

receiving a target reference voltage at a voltage regulating circuit, the voltage regulating circuit to provide an output voltage;

generating an internal reference voltage, a level of said internal reference voltage based on a level of said output voltage; and generating said output voltage in response to selecting one of said target reference voltage and said internal reference voltage, said selection based on a difference between said target reference voltage and said output voltage wherein generating said internal reference voltage further comprises:

generating an incremented internal reference voltage that is greater than said output voltage, and selecting said incremented internal reference voltage in response to said target reference voltage being higher than said incremented internal reference voltage; or generating a decremented internal reference voltage that is lower than said output voltage, selecting said decremented internal reference voltage in response to said target reference voltage being lower than said decremented internal reference voltage.

12. The method of claim 11, wherein said internal reference voltage does not differ from said output voltage in absolute value by more than a maximum allowed difference.

13. The method of claim 11, further comprising selecting said target reference voltage in response to said target reference voltage being lower than said incremented internal reference voltage.

14. The method of claim 11, further comprising selecting said target reference voltage in response to said target reference voltage being lower than said incremented internal reference voltage and higher than said decremented internal reference voltage.

* * * * *